United States Patent [19]

De Boel

[11] Patent Number: 4,485,601
[45] Date of Patent: Dec. 4, 1984

[54] FIRE SCREENING GLAZING PANELS

[75] Inventor: Marcel De Boel, Chatelet, Belgium

[73] Assignee: Glaverbel, Brussels, Belgium

[21] Appl. No.: 368,623

[22] Filed: Apr. 15, 1982

[30] Foreign Application Priority Data

Apr. 21, 1981 [GB] United Kingdom ............... 8112396

[51] Int. Cl.³ .............................................. B32B 17/06
[52] U.S. Cl. ........................................ 52/232; 52/789; 428/34
[58] Field of Search ............................. 52/232, 788–790; 428/34

[56] References Cited

U.S. PATENT DOCUMENTS

| | | | |
|---|---|---|---|
| 3,974,316 | 8/1976 | Jacquemin | 428/332 |
| 3,997,700 | 12/1976 | Jacquemin | 428/332 |
| 4,047,351 | 9/1977 | Derner | 428/34 |
| 4,104,427 | 8/1978 | Nolte | 428/68 |
| 4,173,668 | 11/1979 | Hentzelt | 428/34 |
| 4,190,698 | 2/1980 | De Boel | 428/334 |
| 4,203,264 | 5/1980 | Kiefer | 52/789 |
| 4,268,581 | 5/1981 | De Boel | 428/428 |

Primary Examiner—Henry E. Raduazo
Attorney, Agent, or Firm—Spencer & Frank

[57] ABSTRACT

Fire screening glazing panels comprise at least one layer 2, 6 of intumescent material such as hydrated sodium silicate sandwiched between flat vitreous sheets 1, 3, 7. To promote fire resistance in a simple and economical way, at least one (and preferably only one) vitreous sheet 1 has a thickness of 6 mm or more, preferably from 7 to 10 mm. The or each other vitreous sheet 3, 7 has a preferred thickness range of 2.5 to 4 mm. The thicker sheet 1 is best located in the interior of a panel with three or more vitreous sheets and it or any other vitreous sheet may be made of boro-silicate or other low expansion or high softening point vitreous material.

19 Claims, 4 Drawing Figures

FIRE SCREENING GLAZING PANELS

BACKGROUND OF THE INVENTION

The present invention relates to a fire screening glazing panel comprising at least one layer of intumescent material sandwiched between flat vitreous sheets.

In the construction of buildings, glazing panels have often to be used in exterior or interior walls or partitions. An obvious example is the use of transparent glazing panels used in windows. Opaque glazing panels are also often used in the lower part of interior partitions.

There is an increasing requirement that such glazing panels should satisfy certain stringent standards of fire resistance. There are various modern standards in use, but broadly they lay down that when one face of such a panel is exposed to a specified heating schedule simulating a fire, the mean temperature of the other face should remain below a specified value for a specified period of time, and during the same period, the maximum temperature of any part of that face should not rise above a certain level.

Furthermore it is clearly desirable that such a panel should retain its integrity for as long as possible after the outbreak of fire so that it can remain as an effective flame and fume barrier and provide a shield against radiant heat.

One test is laid down in International Standard ISO 834 (Fire resistance tests - Elements of building construction). Briefly stated this test involves mounting the panel to be tested in the wall of a furnace which is then heated according to a predetermined schedule, and measuring the time after which the panel no longer remains intact as a flame and fume proof barrier or after which its outer face becomes unacceptably hot. Not only should the panel be resistant to thermal shock, but it should also be resistant to physical shock for as long as is practically desirable after the outbreak of fire lest a person who accidentally (or even deliberately) breaks it becomes suddenly engulfed in flame.

Various proposals have been made for the manufacture of fire screening glazing panels including in particular British Pat. No. 1,290,699 (BASF). This document teaches the use of one intumescent layer sandwiched between two glass sheets and two intumescent layers sandwiched between three sheets of glass in the manufacture of fire screening glazing panels which can be made to satisfy criteria laid down in various standards pertaining to the fire resistance of glazings.

The panels specifically proposed in the BASF specification referred to above make use of glass sheets about 3 mm in thickness and this is typical of prior proposals in the field of fire screening glazing panels.

Known fire screening panels can be made to satisfy ISO 834 for periods of up to 20 minutes without especial difficulty and longer periods of fire resistance can be achieved by taking certain additional steps.

One way is to increase the thickness of the panel. Since it is well known in the art thick vitreous sheets are more apt to crack due to thermal shock to which they would inevitably be subjected on the outbreak of fire, the maximum individual sheet thickness envisaged in prior art proposals has been 5 mm, and further increases in panel thickness have been achieved by using additional sheets and layers of intumescent material. This adds considerably to costs and manufacturing difficulties.

A second way is to mount two known fire screening panels in a double panel frame, but such double panels are again expensive and are rather too cumbersome for use in some circumstances.

A third way is to include glass fibres and wire mesh in an intumescent layer, but this also gives rise to manufacturing difficulties and, in the case of transparent fire screening glazing panels, with which this invention is particularly but not exclusively concerned, the addition of such materials detracts from the appearance and light transmissivity of the panel.

SUMMARY OF THE INVENTION

It is an object of the present invention to provide fire screening glazing panels of a modified construction which allows a high standard of fire resistance to be achieved more easily in a simple and economical manner.

According to the present invention there is provided a fire screening glazing panel comprising at least one layer of intumescent material sandwiched between flat vitreous sheets, characterised in that at least one said vitreous sheet has a thickness of at least 6 mm.

The presence in the panel of a sheet which is at least 6 mm thick provides a number of advantages which together make the panel particularly useful for fire screening purposes. It will be appreciated however that, except in the case of a wholly symmetrical panel, these advantages may differ in extent according to the side of the panel on which fire breaks out. In the case of a panel incorporating sheets of different thicknesses these advantages are always much greater when the thicker vitreous sheet lies between the fire and at least one thinner vitreous sheet of the panel and therefore this point should be borne in mind when the panel is installed.

It is in fact rather surprising that the use of a vitreous sheet 6 mm or more in thickness should give advantages in a fire screening glazing panel, since as has been noted above, it is well known in the art that thick vitreous sheets are more apt to break as a result of thermal shock than are thinner sheets.

The use of such a thick vitreous sheet tends to ensure, because of the greater mass of the sheet, that an intumescent layer located behind it will be heated more uniformly thus reducing the formation of hot spots on the exposed face of the panel facing away from the fire. Also, the intumescent layer will tend to expand more uniformly over its area. Furthermore, when such a thick vitreous sheet breaks due to thermal shock, as of course it eventually will if the heat is strong enough, its mass tends to ensure that it does not readily fragment, and that if it does, such fragments, because of their greater thickness, will tend to remain in place for longer than in the case of thinner vitreous sheets. This is extremely important.

It has been found that the cost effectiveness of panels according to the invention is enhanced when at least one said vitreous sheet has a thickness in the range from 7 mm to 10 mm inclusive, as is preferred. In fact a particularly preferred thickness for such a sheet is 8 mm.

In some preferred embodiments of the invention, at least one vitreous sheet of the panel has a thickness which is different from the thickness of the or at least one other vitreous sheet. When a thicker vitreous sheet is located between a fire and a thinner vitreous sheet, a saving in vitreous material and weight is achieved according to the difference in thickness of the sheets and this can be done without significantly affecting the fire resistance characteristics of the panel. Such a panel is less expensive and easier to install, and does not require a relatively heavy and expensive frame.

The advantages of using sheets of different thicknesses in a panel according to the invention are particularly apparent when one or more of the following preferred features is adopted:
(i) of the different thicknesses exhibited by the various sheets of the panel, the maximum thickness is at least twice the minimum thickness;
(ii) at least one vitreous sheet of the panel has a thickness less than 6 mm;
(iii) only one vitreous sheet of the panel has a thickness of at least 6 mm; and
(iv) at least one vitreous sheet of the panel has a thickness in the range from 2.5 mm to 4 mm inclusive.

In some preferred embodiments of the invention, the panel comprises at least three vitreous sheets and at least two sandwiched intumescent layers. This admittedly adds to the cost of the panel, but it is justified where particularly stringent criteria of fire resistance must be met. Of course the number of vitreous sheets and intervening intumescent layers used in any particular panel according to the invention will depend upon the fire resistance criteria which it is intended should be met by that panel.

In such embodiments of the invention, it is advantageous that the or at least one internal vitreous sheet has a said thickness of at least 6 mm since this gives the best results in terms of fire resistance.

Alternatively, or in addition, it is preferred that there are three successive vitreous sheets of the panel such that the thickness of one of them is at least equal to the sum of the thicknesses of the other two. This promotes the efficacy of the panel without unduly increasing its weight.

It is especially preferred for the various sheets to be arranged symmetrically of the centre of the panel according to their respective thicknesses since the panel is then equally efficacious no matter on which side of it a fire should break out.

In order to reduce the likelihood of cracking or fragmenting due to thermal shock, it is preferred that at least the or each vitreous sheet whose thickness is 6 mm or more is formed of a material whose coefficient (E) of expansion in the temperature range 0° to 400° is at most $7.5 \times 10^{-6}$ per °C.

In addition to the problem of fragmentation of sheets of a fire screening panel, a further problem may be encountered when such a panel is subjected to very intense heat: under some circumstances, the vitreous material may be heated to a temperature above its softening point so that any cracks in the sheet become opened and the sheet may start to collapse under its own weight. For the purposes in view, it is believed that the dilatometric softening point of the glass is of particular importance and this is defined as the temperature at which the vitreous material has a viscosity of $10^{11.5}$ poises (the 11.5 temperature). In order to alleviate this problem, it is preferred that at least the or each vitreous sheet whose thickness is 6 mm or more is formed of a material whose dilatometric softening point (11.5 temperature) is at least 600° C.

Such expansion and softening criteria can be met by selecting said material from borosilicate glasses, vitroceramic or vitro-crystalline materials, or aluminosilicate or alumino-boro-silicate glasses, as is preferred. Examples of compositions of an alumino-silicate and three alumino-boro-silicate gasses which have been found satisfactory are as follows (parts by weight):

| | | | | |
|---|---|---|---|---|
| $SiO_2$ | 62.8 | 69.5 | 73.25 | 70 |
| $Al_2O_3$ | 8.4 | 4.0 | 6.2 | 10 |
| $B_2O_3$ | 1.1 | 8.7 | 7.2 | 8 |
| $Na_2O$ | 11.7 | 9.3 | 8.1 | 8 |
| BaO | 2.4 | 5.5 | — | — |
| CaO | — | 3.0 | 3.4 | 3 |
| MgO | 4.4 | — | 1.7 | 1 |
| ZnO | 8.2 | — | — | — |
| $TiO_2$ | 0.6 | — | — | — |
| $As_2O_3$ | 0.4 | — | 0.15 | — |
| 11.5T(°C.) | 607 | 607 | 618 | 623 |
| $E \times 10^{-6}$(°C.$^{-1}$) | 7.25 | 6.39 | 5.3 | 5.34 |

The panel is preferably constituted as a laminate in which the vitreous sheets and the intumescent layer(s) are bonded together, and it is preferably transparent.

In some embodiments of the invention, at least one sheet of the panel, preferably including the or each sheet whose thickness is 6 mm or more, is of tempered glass, especially chemically tempered glass. This affords advantages when the panel is to be used in situations where the resistance to breakage of the panel prior to the outbreak of fire is of particular importance.

High degrees of fire resistance can be achieved when the or each intumescent layer is at least 1.5 mm in thickness, and preferably the total thickness of intumescent material in the panel is at least 3.5 mm. The quantity of intumescent material used has an effect on the period for which the panel maintains its fire resistance.

The intumescent material most particularly in view is hydrated sodium silicate, though other hydrated metal salts are suitable. It is especially suitable to use hydrated sodium silicate in which the weight ratio $SiO_2 : Na_2O$ is 3.4:1 and containing 30 to 35% by weight water.

BRIEF DESCRIPTION OF THE DRAWING

The invention will now be described with reference to the accompanying drawings, FIGS. 1 to 4 of which represent diagrammatically, cross-sections of various embodiments of fire screening panel.

DESCRIPTION OF THE PREFERRED EMBODIMENTS

Figure 1:
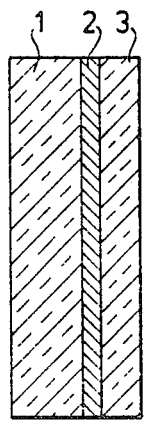

In FIG. 1, the panel shown comprises a vitreous sheet 1 which has a thickness of at least 6 mm. A layer 2 of intumescent material is sandwiched between the first vitreous sheet 1 and a second vitreous sheet 3 located to the right of the first sheet. The first vitreous sheet 1 is shown as being thicker than the second vitreous sheet 3, but in a variant (not shown) they are of equal thicknesses.

Figure 2:
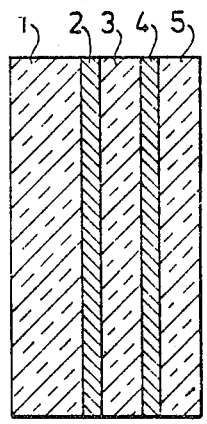

FIG. 2 shows a panel which includes a similar sandwich 1, 2, 3 together with a second intumescent layer 4 sandwiched between the second vitreous sheet 3 and a third vitreous sheet 5. This third sheet 5 is also shown as being thinner than the first sheet 1, but again, it may be of equal thickness to the first sheet 1. The second sheet 3 may be thinner than the first sheet 1 or of equal thickness.

Figure 3:
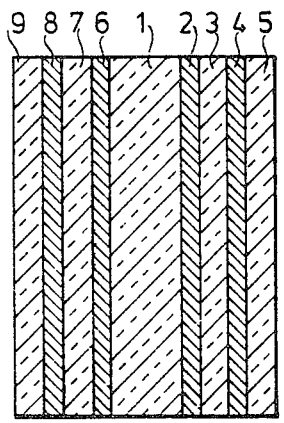

FIG. 3 shows a panel similar to the panel of FIG. 2 to which is added a third intumescent layer 6 sandwiched between the left hand side of the first vitreous sheet 1 and a fourth vitreous sheet 7, again thinner than the first sheet 1 and a fourth intumescent layer 8 sandwiched between that fourth thinner sheet 7 and a fifth sheet 9 again of relatively thin vitreous material.

Figure 4:
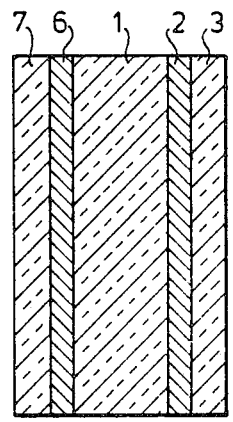

FIG. 4 shows a symmetrical panel corresponding to that shown in FIG. 3 but modified by the absence of the outer intumescent layers 4 and 8 and the outer vitreous sheets 5 and 9.

In FIGS. 3 and 4, the internal vitreous sheet 1 is at least twice as thick as any other vitreous sheet (3, 5, 7, 9 in FIG. 3 and 3, 7 in FIG. 4) of the panel. Thus of three successive sheets including the thicker sheet 1 of these panels (7, 1, 3 in FIGS. 3 and 4, and 9, 7, 1, or 1, 3, 5 in FIG. 3) the thicker sheet 1 has a thickness at least equal to the sum of the thicknesses of the other two sheets.

EXAMPLE 1

(FIG. 4)

A transparent fire resistant glazing panel comprises two sheets 7,3 of glass 3 mm in thickness between each of which and a central vitreous sheet 1 which is 8 mm thick is sandwiched a layer 6, 2 of hydrated sodium silicate 1.8 mm thick.

Such panels have been tested according to International Standard ISO 834 and a corresponding Belgium Standard NBN 713-020.

Briefly stated, this test comprises mounting a panel of the size to be used in practice in a wall of a furnace in which the temperature (T° C. above ambient temperature) is raised according to the formula:

$T = 345 \log_{10}(8t+1)$ where t is the elapsed time in minutes.

This gives a temperature schedule as follows:

| Time (Minutes) | Temperature (°C. above ambient) |
| --- | --- |
| 5 | 556 |
| 10 | 659 |
| 15 | 718 |
| 30 | 821 |
| 60 | 925 |
| 90 | 986 |
| 120 | 1029 |

To satisfy the test, the panel must remain intact as a flame-proof and fume-proof barrier, the mean temperature of the face of the panel directed to the exterior of the furnace must not increase above its initial (ambient) temperature by more than 140° C. and not point on that face of the panel may increase in temperature by more than 180° C.

A panel according to this Example has been found to satisfy this test for at least 30 minutes. In fact the first point on the panel face directed to the exterior of the furnace which increased in temperature by more than 180° C. was only found after about 50 minutes.

The panel of Example 1 may be compared with two other panels, a first having three 3 mm glass sheets sandwiching two equal-thickness layers of hydrated sodium silicate, the second consisting of two 3 mm glass sheets and a single silicate layer. For the same total thickness of intumescent layer, the panel according to Example 1 was found to last 10–15 minutes longer than the first of such comparative panels and 20–25 minutes longer than the second.

EXAMPLE 2

(FIG. 4)

Transparent fire resistant glazing panels have been made as described in Example 1 save that each layer of hydrated sodium silicate was increased in thickness to 2.5 mm.

When subjected to the same test, such panels remained satisfactory for at least 60 minutes.

In a variant of this Example, the silicate layers 2, 6 are formed on the relatively thin vitreous sheets 3, 7 and they are bonded to the thicker vitreous sheet 1 using films of polyvinyl butyral. This has the advantage of imparting better aging properties to the panel (prior to its exposure to fire) so that a high degree of transparency is maintained for longer.

EXAMPLE 3

(FIG. 2)

Glazing panels have been constructed in accordance with FIG. 2 in which the thicker sheet 1 was of 6 mm glass and the two thinner sheets 3 and 5 were each of 3 mm glass. The intervening layers 2, 4 of intumescent material were of hydrated sodium silicate each 1.8 mm thick. When subjected to the test if ISO-834 these panels were found to give satisfactory fire resistance for at least 30 minutes.

EXAMPLE 4

(FIG. 3)

Glazing panels have been constructed in accordance with FIG. 3 in which the thicker sheet 1 was of 8 mm glass while each other vitreous sheet 9, 7, 3, 5 was of 3 mm glass. Each intumescent layer 8, 6, 2, 4 was of hydrated sodium silicate 2.5 mm thick. Such panels have been found to satisfy the fire resistance test of ISO-834 for over 90 minutes.

EXAMPLE 5

(FIG. 1)

Glazing panels were constructed in accordance with FIG. 1 with their thicker sheets 1 having a thickness of 10 mm and their thinner sheets of 3 mm glass, in each case sandwiching a layer of hydrated sodium silicate 2.5 mm thick.

The thicker (10 mm) sheets were made of each of the alumino-silicate and alumino-boro-silicate glasses whose compositions are set out earlier in this specification. When tested according to ISO-834 with their thicker sheets facing the furnace interior, each of these panels exhibited satisfactory fire resistance for at least 30 minutes.

In variants of the Example, the thinner sheet was also of one of the glass compositions set out above.

In variants of any of Examples 1 to 4, the thicker glass sheet was formed of any one of the alumino-silicate and alumino-boro-silicate glasses whose compositions are set out above.

In further variants of any of the Examples, the thicker sheets 1 and/or any vitreous sheet forming an exterior face of the panel were of chemically tempered glass.

In yet further variants of any of the Examples, the thicker sheets 1 and/or the or any other vitreous sheet of the panel is of a vitro-crystalline or vitro-ceramic material. Such materials can be made by subjecting a glass to a heat treatment so as to induce the formation of one or more crystalline phases therein. Two suitable vitro-crystalline materials have the following compositions and properties (composition in % by weight)

| | | |
|---|---|---|
| SiO$_2$ | 65 to 73 | 43 to 49 |
| Al$_2$O$_3$ | 16 to 26 | 17 to 30 |
| Li$_2$O | 4 to 5 | — |
| TiO$_2$ | 4 to 5 | 8 to 12 |
| MgO | — | 4 to 12 |
| ZnO | — | Around 26 |
| CdO | — | Around 15 |
| E × 10$^{-6}$(°C.$^{-1}$) | 0.48 to 0.53 | 1.4 to 3.9 |
| | Transparent | Translucent (Diffuse transmission) |

I claim:

1. A fire screening glazing panel comprising at least two flat vitreous sheets and at least one layer of intumescent material sandwiched directly between two of said vitreous sheets to form a vitreous sheet-intumescent layer-vitreous sheet panel, characterized in that a first one of said two vitreous sheets between which said layer of intumescent material is sandwiched has a thickness of at least 6 mm and is thicker than the other one of said two vitreous sheets, said panel being arranged to be installed with said thicker sheet positioned between said layer of intumescent material and the expected origin of a fire.

2. A panel according to claim 1, wherein said first vitreous sheet has a thickness in the range from 7 mm to 10 mm inclusive.

3. A panel according to claim 2, wherein of the different thicknesses exhibited by said two sheets of the panel, the maximum thickness is at least twice the minimum thickness.

4. A panel according to claim 3, wherein said other vitreous sheet of the panel has a thickness less than 6 mm.

5. A panel according to claim 4, wherein only said first vitreous sheet of the panel has a thickness of at least 6 mm.

6. A panel according to claim 4 or 5, wherein said other vitreous sheet of the panel has a thickness in the range from 2.5 to 4 mm inclusive.

7. A panel according to claim 1, wherein the various sheets are arranged symmetrically of the centre of the panel according to their respective thicknesses.

8. A panel according to claim 1, wherein said first vitreous sheet whose thickness is 6 mm or more is formed of a material whose coefficient of expansion over the temperature range 0° C. to 400° C. is at most $7.5 \times 10^{-6}$° C.$^{-1}$.

9. A panel according to claim 1, wherein said first vitreous sheet whose thickness is 6 mm or more is formed of a material whose dilatometric softening point (11.5 temperature) is at least 600° C.

10. A panel according to claim 8 or 9, wherein said material is selected from: boro-silicate glasses, vitro-ceramics, vitro-crystalline materials; alumino-silicate glasses and alumino-boro-silicate glasses.

11. A panel according to claim 1, wherein said vitreous sheets and said intumescent material are laminated directly together.

12. A panel according to claim 1, wherein of the different thicknesses exhibited by said two sheets of the panel, the maximum thickness is at least twice the minimum thickness.

13. A panel according to claim 12, wherein said other vitreous sheet of the panel has a thickness less than 6 mm.

14. A panel according to claim 1, wherein said other vitreous sheet of the panel has a thickness less than 6 mm.

15. A panel according to claim 14 wherein only said first vitreous sheet of the panel has a thickness of at least 6 mm.

16. A panel according to claim 1, wherein each of said vitreous sheets is of ordinary soda-lime glass.

17. A panel according to claim 1 further comprising a third flat vitreous sheet and a second layer of intumescent material sandwiched directly between said third vitreous sheet and one of said two vitreous sheets.

18. A panel according to claim 17 wherein said first vitreous sheet is located between said other vitreous sheet and said third vitreous sheet.

19. A panel according to claim 17 wherein the thickness of said first vitreous sheet is at least equal to the sum of thicknesses of said other vitreous sheet and said third vitreous sheet.

* * * * *